United States Patent
Yoo

(10) Patent No.: US 7,715,827 B2
(45) Date of Patent: May 11, 2010

(54) MOBILE COMMUNICATION TERMINAL AND METHOD FOR CALCULATING MEDIA PLAY TIME OF THE MOBILE COMMUNICATION TERMINAL

(75) Inventor: Young Jin Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 11/556,619

(22) Filed: Nov. 3, 2006

(65) Prior Publication Data

US 2007/0242630 A1 Oct. 18, 2007

(30) Foreign Application Priority Data

Nov. 4, 2005 (KR) .................. 10-2005-0105565
Jan. 23, 2006 (KR) .................. 10-2006-0006933

(51) Int. Cl.
*H04M 1/726* (2006.01)
*H04M 12/68* (2006.01)

(52) U.S. Cl. .............. 455/412.1; 370/240; 370/389; 370/395; 370/473; 370/310; 370/328; 370/484; 370/468; 370/349; 455/67.11; 455/425; 455/3.02; 455/226.1; 709/231; 709/246

(58) Field of Classification Search .......... 370/389, 370/244, 395.6, 473, 310, 204, 328, 484, 370/468, 349; 455/115.1, 67.11, 425, 226.1, 455/566, 3.02; 379/88.16, 88.18; 709/231, 709/246, 203

See application file for complete search history.

(56) References Cited

U.S. PATENT DOCUMENTS

| 6,442,145 | B1 * | 8/2002 | De Lange et al. ............ 370/310 |
| 2002/0012526 | A1 * | 1/2002 | Sai et al. ...................... 386/69 |
| 2002/0093923 | A1 * | 7/2002 | Bouet ......................... 370/328 |
| 2003/0007780 | A1 * | 1/2003 | Senoh ......................... 386/68 |
| 2003/0035517 | A1 * | 2/2003 | Kobylevsky et al. ..... 379/88.16 |

(Continued)

FOREIGN PATENT DOCUMENTS

EP 1 501 301 A 1/2005

(Continued)

OTHER PUBLICATIONS

"Overview of Movie Atoms" [Online] Mar. 1, 2001, XP002418759, retrieved from the Internet: URL:http://developer.apple.com/documentation/QuickTime/QTFF/QTFFChap2/chapter_3_section_2.html> [retrieved on Feb. 6, 2007].

(Continued)

*Primary Examiner*—Rafael Pérez-Gutiérrez
*Assistant Examiner*—Joseph Arevalo
(74) *Attorney, Agent, or Firm*—Workman Nydegger

(57) ABSTRACT

A mobile communication terminal and a method for calculating a media play time of media file on the mobile communication terminal are disclosed. In one example embodiment, a mobile communication terminal includes a communication unit, a controller, and a display. The communication unit is capable of downloading a media file from a media server. The controller is capable of calculating a first data size on the basis of information extracted from the media file. The controller is also capable of calculating a media play time on the basis of the first data size and a second data size of the media file. The display is capable of displaying the media play time.

13 Claims, 7 Drawing Sheets

U.S. PATENT DOCUMENTS

| | | | |
|---|---|---|---|
| 2003/0163478 A1* | 8/2003 | Kirkland | 707/102 |
| 2003/0221014 A1* | 11/2003 | Kosiba et al. | 709/231 |
| 2004/0078266 A1* | 4/2004 | Kim | 705/14 |
| 2004/0231001 A1* | 11/2004 | Kisliakov | 725/134 |
| 2005/0015570 A1* | 1/2005 | Akiyoshi | 711/220 |
| 2005/0025460 A1* | 2/2005 | Hyodo et al. | 386/95 |
| 2005/0064865 A1* | 3/2005 | Goldberg | 455/425 |
| 2005/0085263 A1* | 4/2005 | Kim et al. | 455/556.1 |
| 2005/0276580 A1* | 12/2005 | Zacek | 386/131 |
| 2005/0286463 A1* | 12/2005 | Matsumoto | 370/328 |
| 2006/0009159 A1* | 1/2006 | Leung | 455/67.11 |
| 2006/0037057 A1* | 2/2006 | Xu | 725/90 |
| 2006/0050697 A1* | 3/2006 | Li et al. | 370/389 |
| 2006/0099907 A1* | 5/2006 | Park et al. | 455/3.02 |
| 2006/0120687 A1* | 6/2006 | Kida et al. | 386/46 |
| 2006/0122768 A1* | 6/2006 | Sumizawa et al. | 701/208 |
| 2006/0150122 A1* | 7/2006 | Hintermeister et al. | 715/833 |
| 2006/0153087 A1* | 7/2006 | Kang | 370/244 |
| 2007/0133607 A1* | 6/2007 | Park | 370/484 |

FOREIGN PATENT DOCUMENTS

| | | |
|---|---|---|
| KR | 10-2000-0066071 A | 11/2000 |
| KR | 10-2001-0045984 A | 6/2001 |
| KR | 10-2006-0044504 A | 5/2006 |

OTHER PUBLICATIONS

SC29 (Uploaded by WG1 Convener) ED—Joint Photographic Expert Group (JPEG): "Text of ISO/IEC FDIS 14496-1215444-12: Information technology—Coding of audio-visual objects—Part 12: ISO base media file format Information technology—JPEG 2000 image coding system—Part 12: ISO base media file format [SC29N5219]" Joint Photographic Expert Group Conference, Crowborough: JPEG Forum LTD, GB, Mar. 5, 2003, XP017205028 p. 3, paragraph 8.1-p.19, paragraph 8.8.3.

* cited by examiner

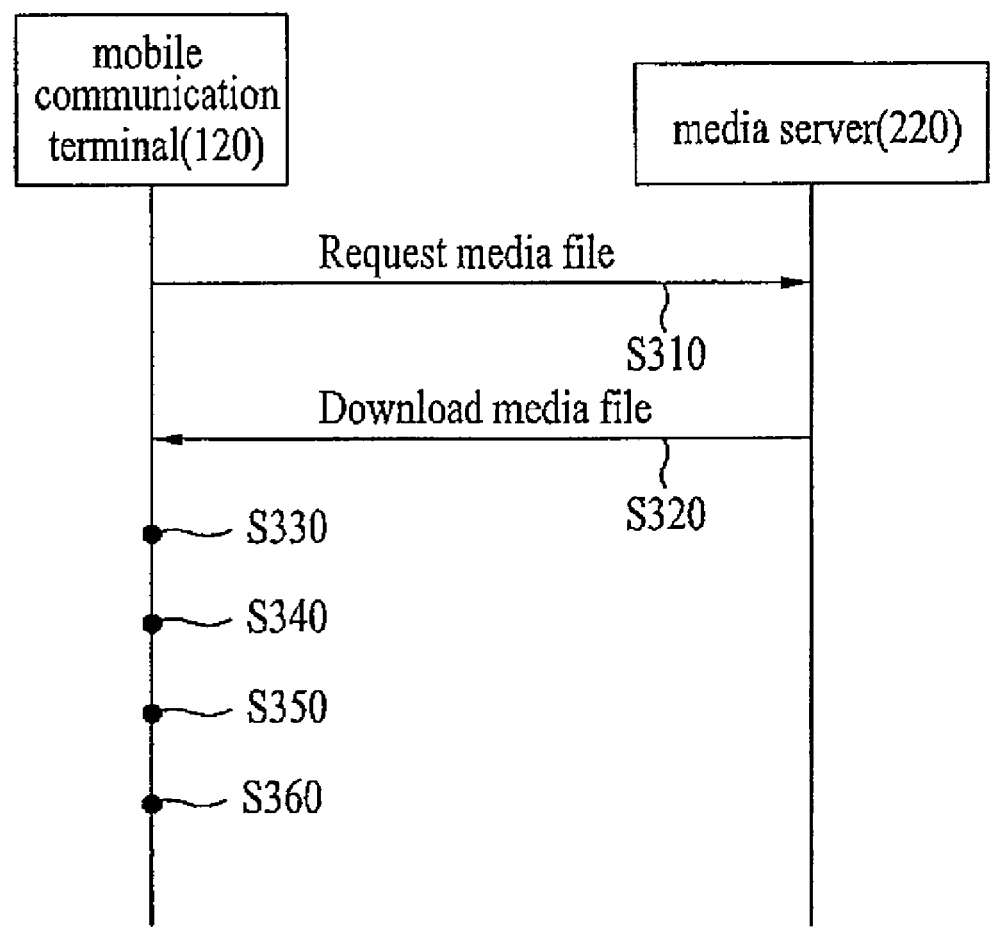

MOBILE COMMUNICATION TERMINAL AND METHOD FOR CALCULATING MEDIA PLAY TIME OF THE MOBILE COMMUNICATION TERMINAL

CROSS-REFERENCE TO RELATED APPLICATIONS

This application claims the benefit of Korean Patent Application Nos. 10-2005-0105565, filed on Nov. 4, 2005, and 10-2006-0006933, filed on Jan. 23, 2006, each of which is hereby incorporated by reference in its entirety.

BACKGROUND OF THE INVENTION

1. Field of the Invention

The present invention relates to a mobile communication terminal. More specifically, embodiments of the invention relate to systems and methods for calculating a media play time for a media file on a mobile communication terminal.

2. Discussion of the Related Art

A progressive download service is a service that is capable of downloading a multimedia file, such as a video and audio file, and that simultaneously presents the downloaded multimedia file to an end user.

There are a variety of mobile communication terminal solutions for supporting this type of service. For example, a Packet Video (PV) Solution is manufactured by the Packet Video Company, located in San Diego, Calif. Also, a QTV™ Solution is manufactured by Qualcomm Corporation headquartered in San Diego, Calif.

The PV Solution product downloads a file having a "pvx" extension from a content server, calculates what percentage of a total data size is represented by the downloaded data size, and provides a user with the calculated result. The PV Solution is designed, therefore, to provide the user with information based primarily on the downloaded data size. However, although a specific media file has a specific data capacity, different play times of the specific media file may occur due to varying image quality. As a result, the PV Solution has difficulty in identifying a correct media play time using only the data size of the media file.

Similarly, the QTV™ Solution product implements a specific algorithm designed to determine whether data to be presented is downloaded on the basis of a location of currently-presented data. Therefore, the QTV™ Solution has difficulty in identifying a correct play time of the currently-downloaded data for similar reasons as in the above-mentioned PV Solution.

SUMMARY

Accordingly, the present invention relates to a mobile communication terminal and, more specifically, to systems and methods for calculating a media "play time" for a media file on a mobile communication terminal. The play time of a downloaded media file is calculated using not only downloaded data size information of the media file, but also using information extracted from the downloaded media file.

In one example embodiment, a mobile communication terminal includes a communication unit, a controller, and a display. The communication unit is capable of downloading a media file from a media server. The controller is configured to calculate a first data size on the basis of information extracted from the media file itself. The controller is also configured to calculate a media play time of the media file on the mobile communication terminal. This calculation is based on the first data size and on a second data size that is downloaded in connection with the media file. In example embodiments, the display is configured to display the media play time to the user.

In another example embodiment, a method for calculating a media play time of a media file using a mobile communication terminal capable of downloading a media file from a media server includes: requesting, by a mobile communication terminal, a media file from a media server; if the media server transmits the media file, downloading, by the mobile communication terminal, the media file; determining a first data size on the basis of information extracted from the media file; calculating a play time on the basis of the first data size and a second data size downloaded in connection with the media file; and then displaying the play time.

In yet another example embodiment, a method for facilitating the calculation of a media play time using a mobile communication terminal includes: encoding a media file; calculating a first data size on the basis of information extracted from the media file; and recording the calculated first data size in the media file.

Additional advantages, objects, and features of the invention will be set forth in the description which follows and in part will become apparent upon examination of the following or may be learned from practice of the invention. The objectives and other advantages of the invention may be realized and attained by the structure particularly pointed out in the written description and claims hereof as well as the appended wings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, disclose embodiments of the invention and together with the description serve to explain example principles of the invention. In the drawings:

FIG. 8 is a flow chart disclosing a call process between a mobile communication terminal and a media server according to a second example embodiment of the present invention.

DETAILED DESCRIPTION OF EXAMPLE EMBODIMENTS

Reference will now be made in detail to example embodiments of the present invention which are disclosed in the accompanying drawings. Wherever possible, the same reference numbers will be used throughout the drawings to refer to the same or like parts.

Figure 1:
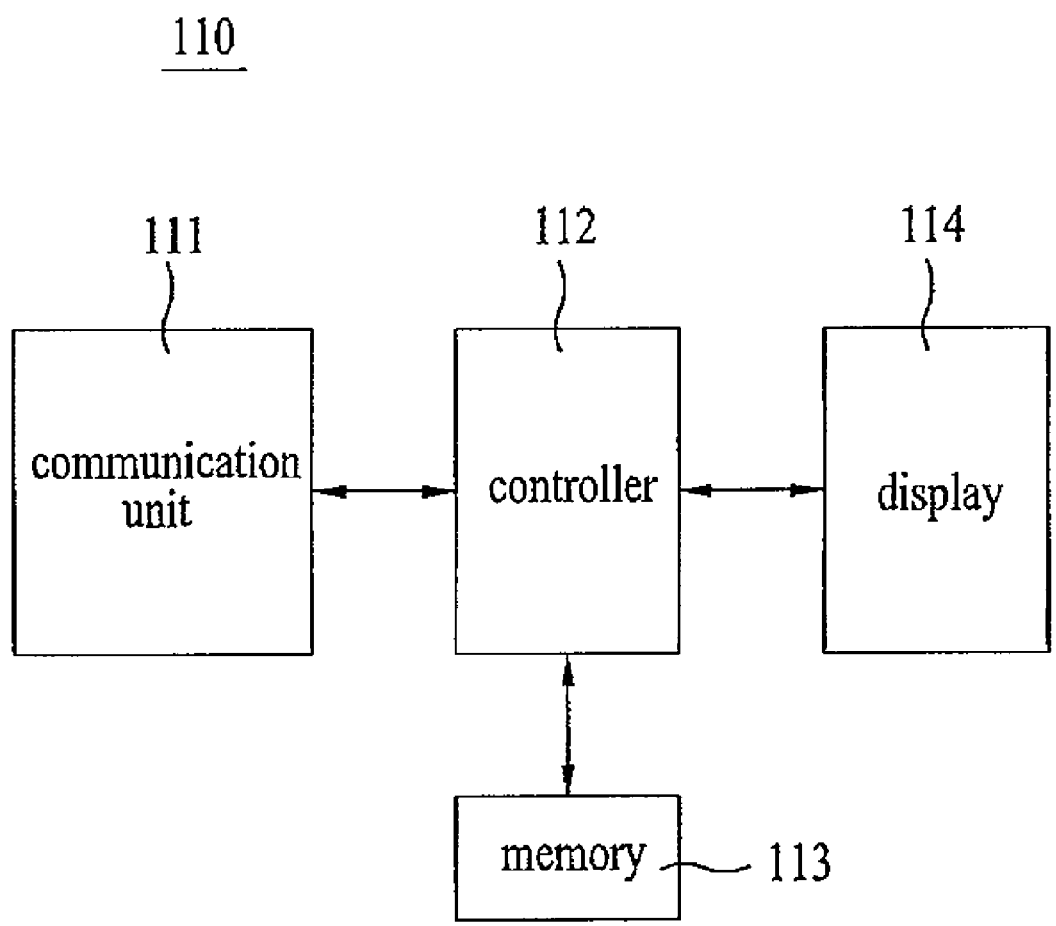
FIG. 1 is a block diagram disclosing a mobile communication terminal according to a first example embodiment of the present invention.

FIG. 1 is a block diagram disclosing one example of a mobile communication terminal 110 that can be used in connection with the present invention. As is shown, the mobile communication terminal 110 includes a controller 112, a communication unit 111, a memory 113, and a display 114.

The communication unit 111 is configured to, among other functions, download a media file from a media server (not shown). In this case, the media server is a server capable of providing the mobile communication terminal 110 with the media file using one of a variety of communication schemes. The memory 113 is a storage unit for storing the media file downloaded from the media server via the communication unit 111. The display 114 is a display for displaying information about the media file, such as a total "play time." If the media file is an image or video file, the above-mentioned media may also be displayed on the display 114.

The controller 112 is configured so as to be capable of programmably calculating a data-size-per-second on the basis of information extracted directly from the contents of a media file that is retrieved via the communication unit 111. The controller 112 is also configured so as to calculate a "play time" of the downloaded media file. This calculation is performed by using the calculated data-size-per-second, and a downloaded data size of a media file. This play time is then displayed to a user via the display 114.

In example embodiments, the media file manipulated by the controller 112 may have a file format based on 3GPP (3rd Generation Partnership Project). A 3GPP formatted file is formed of a plurality of objects, each of which is referred to as a "box". A box is an object-oriented building block defined by a single unique identifier (ID) having a unique length. Also, the above-mentioned box may also be called an "atom". All data associated with a media file is contained in the boxes of the media file.

Some representative boxes contained in the 3GPP media file include, for example, a movie box ("moov"), a media data box ("mdat"), a movie header box ("mvhd"), and a track box ("trak").

The "mvhd" is a box including overall information associated with characteristics of the "moov". The "moov" includes a single "mvhd". A variety of information is contained in the "mvhd" such as a creation time of the "moov", a modification time of the "moov", a timescale of the "moov", a duration of the "moov", a rate of the "moov", and a volume of the "moov".

The "trak" is a box including one or more tracks. A single track corresponds to either a sequence of images or a sampled audio. Therefore, a "trak" is classified as either a video "trak" or an audio "trak". The "moov" includes at least one "trak".

Each "trak" includes a track header box ("trhd"), a track reference box ("tref"), a media box ("mdia"), an edit box ("edts"), and a user data box ("udta").

The above-mentioned "mdia" includes a media header box ("mdhd"), a handler reference box ("hdlr"), and a media information box ("minf"). The "mdhd" contains overall information associated with characteristic information of a corresponding media. The "minf" includes all objects containing characteristic information of a corresponding media.

The above-mentioned "minf" includes a sample data box ("stbl"). The "stbl" is a box including "time and data indexing" of media samples contained in a single track. The "stbl" includes a sample description box ("stsd") and a sample size box ("stsz").

The "stsz" includes information specifying the number of samples and other information specifying the size of individual samples. In this case, the sample size is expressed in the form of byte units. The number of total samples of the media file is equal to the number of samples, or in other words, the sample count.

With reference to the above-mentioned samples, a single sample may be, for example, a single video frame, a series of consecutive video frames, or audio data of a compressed section.

In an example implementation, the controller 112 extracts duration information and timescale information from the "mvhd" of the media file in order to calculate the data-size-per-second, and extracts sample count and sample size from the "stsz". The controller 112 divides the duration into a plurality of timescale units, and calculates a total running time on the basis of the divided result. Also, the controller 112 divides the sample count by the total running time, and calculates the sample-count-per-second on the basis of the divided result.

The controller 112 adds up each the above-mentioned sample-count-per-sec of the sample size, such that it calculates the data-size-per-sec on the basis of the added result. In the case where the sample size(s) have only one unique value, the controller 112 multiplies the sample size(s) sample-count-per-sec times. In cases where the sample size is an array of different values, the controller 112 sequentially adds up each of the sample-count-per-secs of the array of the sample sizes. Then, the controller 112 compares the above-mentioned data-size-per-sec with the downloaded data size of a current media file, and calculates a play time according to the result of the comparison.

Figure 2:
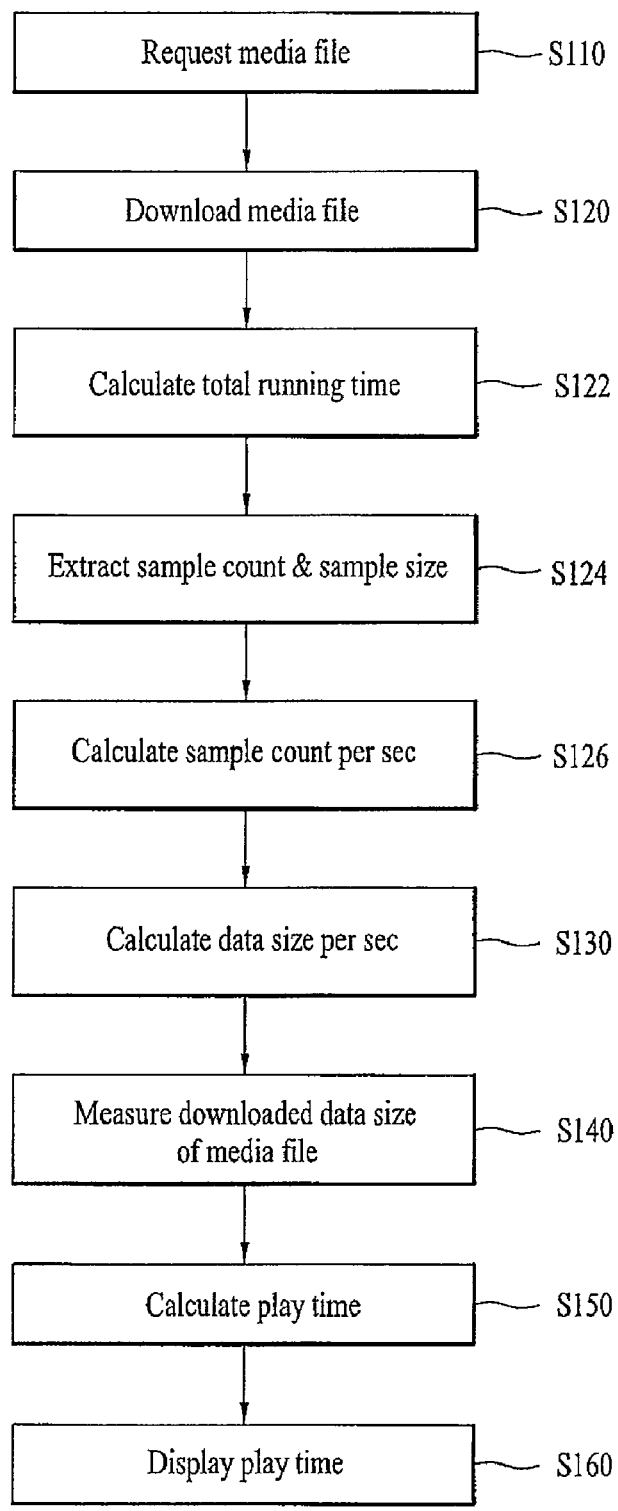
FIG. 2 is a flow chart disclosing an example method for calculating a media play time according to a first example embodiment of the present invention.
Figure 3:
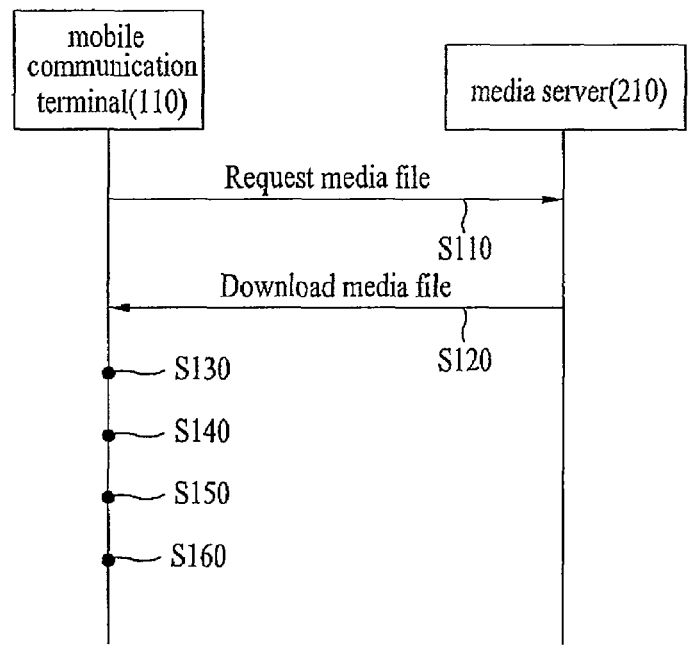
FIG. 3 is a flow chart disclosing a call process between a mobile communication terminal and a media server according to a first example embodiment of the present invention.

FIG. 2 is a flow chart disclosing one example method for calculating a media play time. FIG. 3 is a flow chart disclosing a call process between a mobile communication terminal and a media server according to a first example embodiment of the present invention. With reference now to FIGS. 2 and 3, the various acts S110 to S160 disclosed in FIGS. 2 and 3 will be discussed in detail.

The mobile communication terminal 110 requests a specific media file from the media server 210 at S110. If the media server 210 transmits a media file, the mobile communication terminal 110 downloads the media file at S120.

The mobile communication terminal 110 extracts the duration information and the timescale information from the media file, and calculates a total running time, using Equation 1, at S122. The duration information and the timescale information may be extracted from the movie header box of the media file.

Total Running Time[sec]=Duration[sec]/timescale [Equation 1]

The mobile communication terminal 110 extracts the sample count and the sample size at S124. In this case, the sample count and the sample size may be extracted from the sample size box "stsz" of the media file.

The sample size may be configured in the form of a table array composed of several sequential constant values instead of a single constant value. A representative example of the above-mentioned sample size is disclosed in Table 1:

TABLE 1

| Sample Size |
| --- |
| Sample[0] = 7 Bytes |
| Sample[1] = 7 Bytes |
| Sample[2] = 6 Bytes |
| Sample[3] = 9 Bytes |
| Sample[4] = 8 Bytes |
| Sample[5] = 8 Bytes |
| Sample[6] = 6 Bytes |
| Sample[7] = 6 Bytes |
| Sample[8] = 7 Bytes |

The mobile communication terminal 110 next calculates the sample-count-per-sec at S126 using the total running time calculated at S122 and the sample count extracted at S124, as disclosed in Equation 2:

Sample count per sec [sec]=sample count/total running time [sec]     [Equation 2]

Then, the mobile communication terminal 110 adds up each the sample-count-per-sec of S126 of the extracted sample size of S122, and calculates the data-size-per-sec on the basis of the added result at S130, using Equation 3:

$$dtsize[m] = \sum_{i=0}^{n-1} Sample[mn+i]$$     [Equation 3]

where:

m=0,1,2,3, . . . , n=sample-count-per-sec,

Sample[mn+i]=mn+$i^{th}$ sample size of an array of the sample sizes, dtsize[m]=$m^{th}$ data-size-per-sec If the sample size is equal to the sample size disclosed in Table 1, the data-size-per-sec can be represented by Table 2:

TABLE 2

| Sample Size | Data-size-per-sec |
| --- | --- |
| Sample[0] = 7 Bytes | dtsize[0] = 20 Bytes |
| Sample[1] = 7 Bytes | |
| Sample[2] = 6 Bytes | |
| Sample[3] = 9 Bytes | dtsize[1] = 25 Bytes |
| Sample[4] = 8 Bytes | |
| Sample[5] = 8 Bytes | |
| Sample[6] = 6 Bytes | dtsize[2] = 20 Bytes |
| Sample[7] = 7 Bytes | |
| Sample[8] = 7 Bytes | |

The mobile communication terminal 110 measures the size of currently-downloaded data at S140, and calculates a play time on the basis of the measured downloaded data size and the calculated data-size-per-sec at S150.

In more detail, the mobile communication terminal 110 accumulates the data-size-per-sec calculated at S140, and calculates the sum of the accumulated data-size-per-sec. Then, the mobile communication terminal 110 compares the calculated sum with the measured data-size-per-sec of S140, such that it calculates a play time according to the comparison result.

If the data-size-per-sec calculated at S130 is equal to data disclosed in Table 2, the accumulated sum of the above-mentioned data-size-per-sec can be represented by Table 3:

TABLE 3

| Data-size-per-sec | Sum of accumulated data sizes |
| --- | --- |
| Dtsize[0] = 20 Kbytes | 1 second 20 Kbytes |
| Dtsize[1] = 25 Kbytes | 2 seconds 45 Kbytes |
| Dtsize[2] = 20 Kbytes | 3 seconds 75 Kbytes |

For example, if the data size information measured at S140 is 50 Kbytes, the data size of 50 Kbytes is higher than 45 Kbytes corresponding to the 2-seconds data size, and is less than 75 Kbytes corresponding to the 3-seconds data size, such that a play time at the measured time point of S140 is 2 seconds.

The play time calculated at S150 is displayed on the display at S160.

Figure 4:
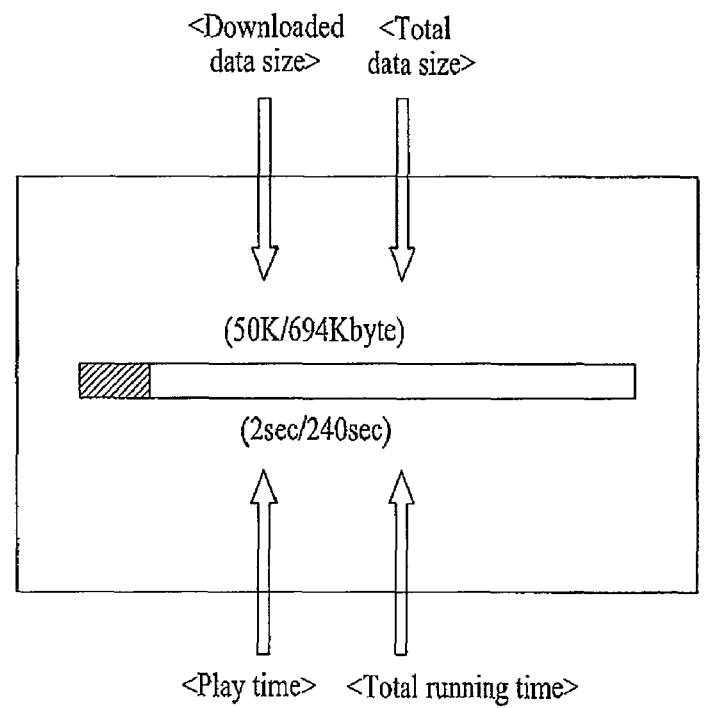
FIG. 4 exemplarily discloses an example display image displayed on a display of a mobile communication terminal according to the present invention.

FIG. 4 exemplarily discloses an example display image displayed on a display of a mobile communication terminal. Referring to FIG. 4, it can be recognized that the currently-downloaded data size is 50 Kbytes whereas a total data size of the media file is 694 Kbytes. It can also be recognized that a play time of the currently-downloaded media file is 2 seconds whereas a total running time of the media file is 24 seconds.

The above-mentioned steps S122-S150 are repeated during the download time of the media file. The higher the downloaded data size of the media file, the longer the play time of the media file.

Figure 5:
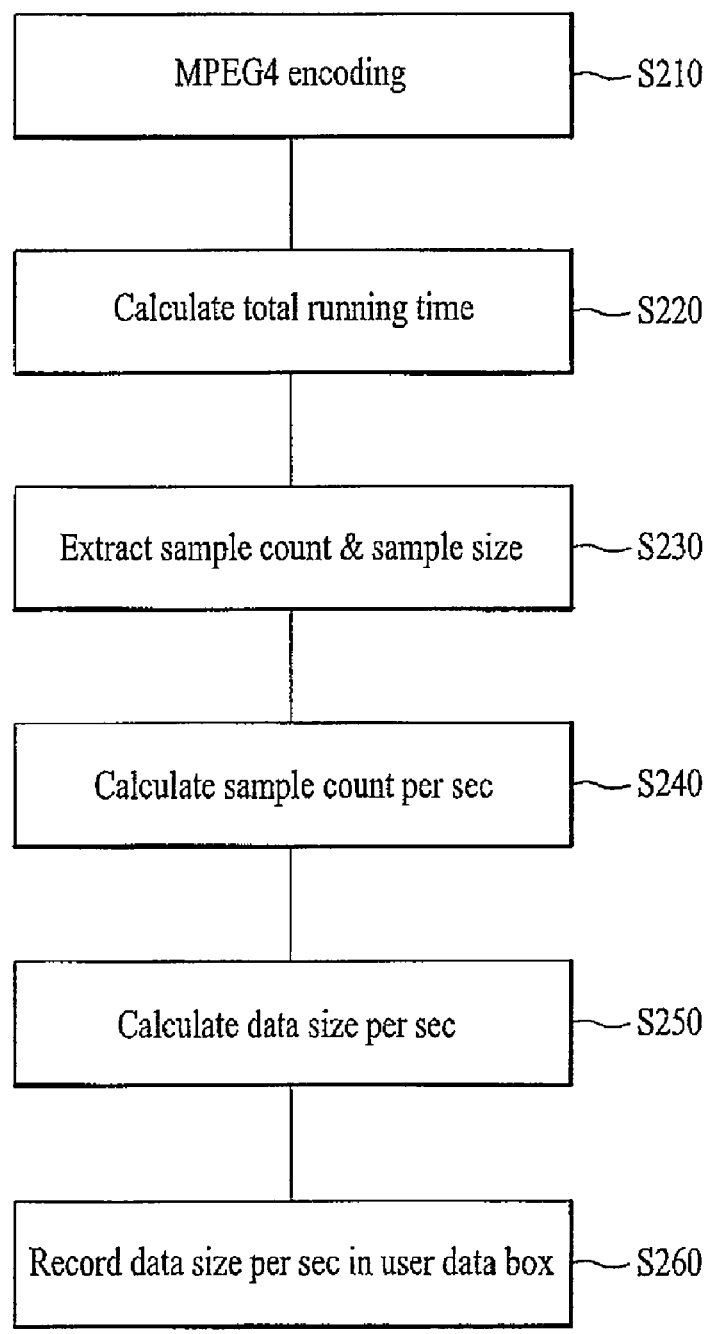
FIG. 5 is a flow chart disclosing an example method for facilitating calculation of a media play time according to a second example embodiment of the present invention.

FIG. 5 is a flow chart disclosing an example method for facilitating the calculation of a media play time according to a second example embodiment of the present invention. With reference now to FIG. 5, the various acts S210 to S260 disclosed in FIG. 5 will be discussed in detail.

A media server or a media encoder encodes the media file at S210. In this case, the media server or the media encoder may encode the media file according to the MPEG-4 standard.

Thereafter, the media server extracts duration information and timescale information from the media file, and calculates a total running time using Equation 3 at S220:

Total Running Time[sec]=Duration[sec]/timescale     [Equation 3]

Then, the media server extracts the sample count and the sample size from the media file at S230.

Next, the media server calculates the sample-count-per-sec at S240 using the total running time calculated at S220 and the sample count extracted at S230, as disclosed in Equation 4:

Sample count per sec [sec]=sample count/total running time [sec]     [Equation 4]

The media server adds up each the sample-count-per-sec of S240 of the extracted sample size of S230, and calculates the data-size-per-sec on the basis of the added result at S250.

The media server records the calculated data-size-per-sec in the media file at S260. In the case where the media file has the 3GPP format, the data-size-per-sec can be recorded in the user data box "udta" of the media file.

Therefore, the media server creates a media file using the acts S210-S260. The media file thus created contains the data-size-per-sec. This recorded data-size-per-sec can be extracted from the media file by a mobile communication terminal and used in the calculation of a media play time by the mobile communication terminal. Thus, the acts S210-S260 can help facilitate the calculation of a media play time using a mobile communication terminal once the media file has been downloaded to the mobile communication terminal.

Figure 6:
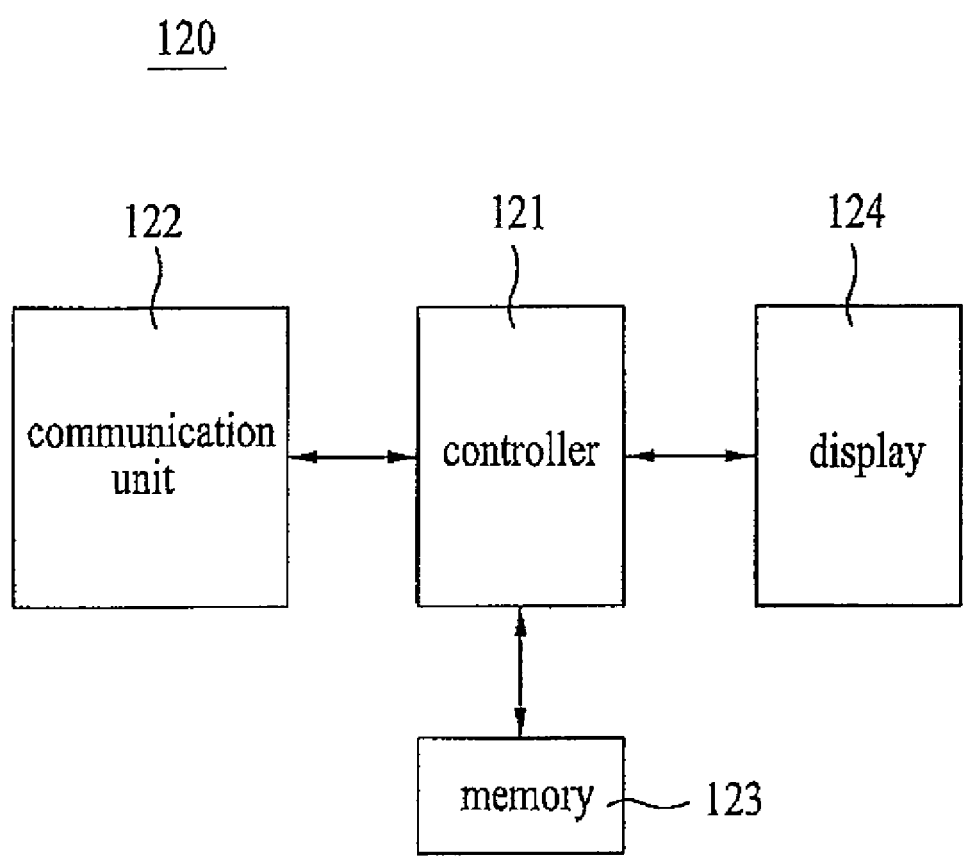
FIG. 6 is a block diagram disclosing a mobile communication terminal according to a second example embodiment of the present invention.

FIG. 6 is a block diagram disclosing a mobile communication terminal 120 according to a second example embodiment of the present invention. The mobile communication terminal 120 includes a controller 121, a communication unit 122, a memory 123, and a display 124.

The controller 121 extracts the data-size-per-sec from the media file and calculates a play time on the basis of the extracted data-size-per-sec and downloaded data size information of the media file. The above-mentioned data-size-per-sec may be extracted from the user data box "udta" of the media file.

In more detail, the controller 121 measures the currently-downloaded data size of the media file, compares the sum of accumulated data sizes with the currently-downloaded data size, and calculates a play time according to the comparison result.

The communication unit 122 downloads a media file from a media server. In this case, the media server is a server capable of providing the mobile communication terminal 120 with the media file, and may be a server capable of manufacturing a media file using the above-mentioned steps S210-S260 disclosed in FIG. 5. The memory 123 is a storage unit for storing the downloaded media file. The display 124 is a display for displaying a play time of the media file. If the media file is an image or video file, the above-mentioned media may be further displayed on the display 124.

Figure 7:
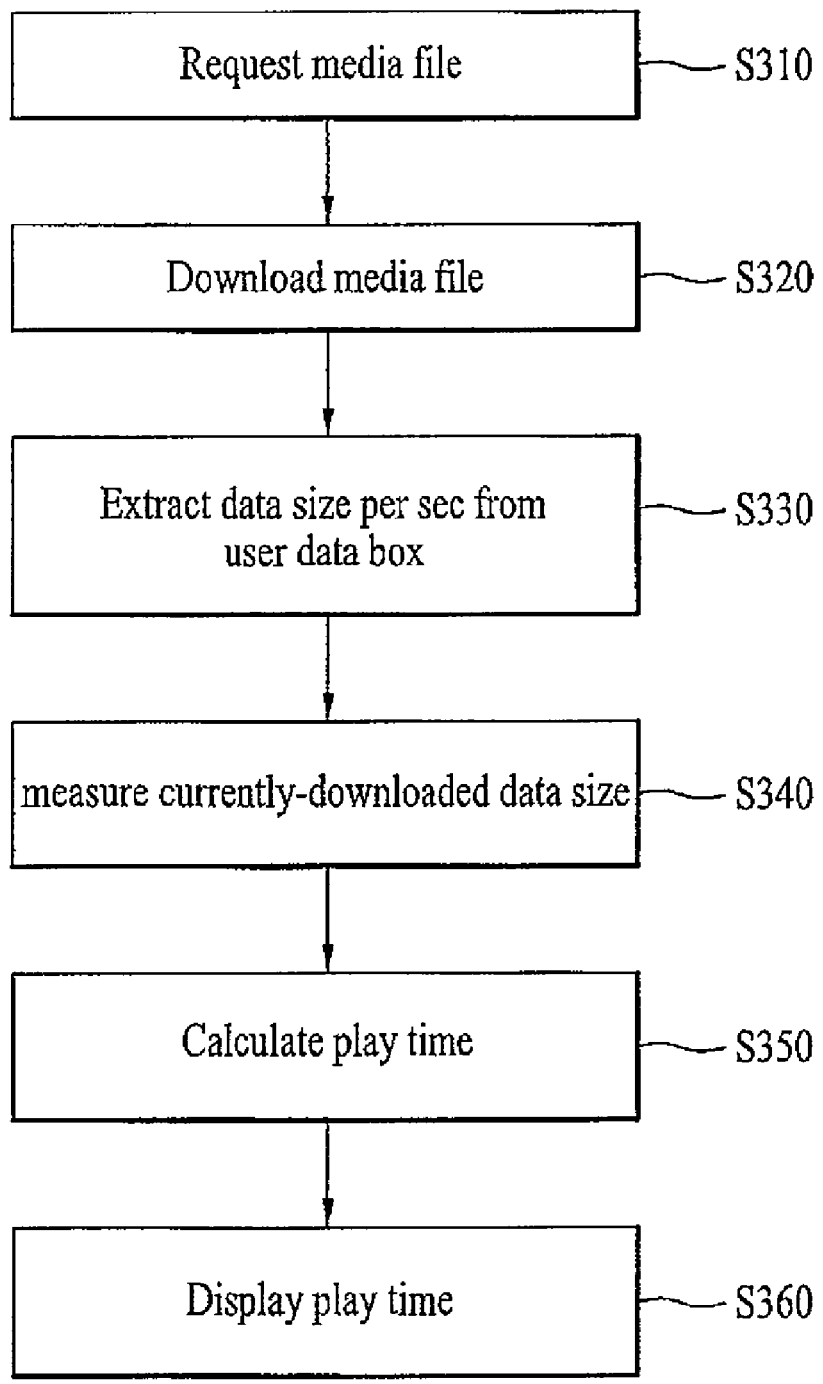
FIG. 7 is a flow chart disclosing an example method for calculating a media play time according to a second example embodiment of the present invention.

FIG. 7 is a flow chart disclosing an example method for calculating a media play time according to a second example embodiment of the present invention. FIG. 8 is a flow chart disclosing a call process between a mobile communication terminal and a media server according to a second example embodiment of the present invention. With reference now to FIGS. 7 and 8, the various acts S310 to S360 disclosed in FIGS. 7 and 8 will be discussed in detail.

The mobile communication terminal 120 requests a specific media file from the media server 220 at S310. Upon receiving the request from the mobile communication terminal 120, the media server 220 transmits a media file, and the mobile communication terminal 120 downloads the media file at S320.

The mobile communication terminal 120 extracts the data-size-per-sec from the media file at S330. The mobile communication terminal 120 may extract the data-size-per-sec from the user data box "udta" of the media file.

Then, the mobile communication terminal 120 measures the size of currently-downloaded data at S340. The mobile communication terminal 120 calculates a play time on the basis of the measured downloaded data size and the calculated data-size-per-sec at S350.

In more detail, the mobile communication terminal 120 compares the sum of accumulated data-size-per-sec with the downloaded data size, such that it calculates a play time according to the comparison result. The calculated play time is displayed on the display at S360. The exemplary display image displayed on the display of the mobile communication terminal as disclosed in FIG. 4 is also suitable for use with this second example embodiment of the present invention.

As apparent from the above description, the example methods for calculating the media file play time according to the present invention have the following effects. Firstly, the example media play time calculation methods can provide a user with a media play time using the downloaded data size and the media file information, such that the user can recognize a correct play time of the media file. Secondly, although the download of a data file may be delayed by network problems and the presentation of the data file may therefore be interrupted, the above-mentioned media play time calculation methods can use a pre-calculated play time to determine whether the data file can be presented by the next downloaded data received after the interruption of data file presentation, such that the amount of resources required for determining the possibility of playable data and a playback time point of the data can be reduced.

Although the present invention has exemplarily disclosed the above-mentioned first and second example embodiments, it should be noted that the scope of the present invention is not limited to the above-mentioned example embodiments, and can be applied to other examples as necessary.

It will be apparent that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal comprising:
    a communication unit configured to download a media file from a media server;
    a controller configured to generate a table indicating a data-size-per-time using information extracted from the media file, measure a data size of currently downloaded data among the media file, and determine a media play time corresponding to the measured data size of the currently downloaded data using the generated table, wherein the extracted information includes a duration, a timescale, a sample count, and a sample size; and
    a display unit configured to display the determined media play time of the currently downloaded data file,
    wherein the controller:
        divides the duration by the timescale to arrive at a total running time,
        divides the sample count by the total running time to arrive at the sample-count-per-time, and
        sequentially adds up the sample size of each sample-count-per-time to arrive at the data-size-per-time, and
    wherein the sample size and the sample-count-per-time are acquired from the extracted information.

2. The mobile communication terminal of claim 1, wherein:
    the duration and the timescale are extracted from a movie header box of the media file; and
    the sample count and the sample size are extracted from a sample size box of the media file.

3. The mobile communication terminal of claim 1, wherein the communication unit is capable of downloading a MPEG-4 media file from a media server.

4. The mobile communication terminal of claim 1, wherein the display unit is further capable of displaying the media file or a total running time of the media file.

5. A method for calculating a media play time using a mobile communication terminal capable of downloading a media file from a media server, the method comprising the acts of:
    a) requesting, by a mobile communication terminal, a media file from a media server;
    b) if the media server transmits the media file, downloading, by the mobile communication terminal, the media file;
    c) acquiring sample size and sample-count-per-time using information extracted from the media file, wherein the information extracted from the media file includes a duration, a timescale, a sample count, and the sample size, wherein acquiring sample size and sample-count-per-time using information extracted from the media file includes:

extracting the duration and the timescale from the media file;

dividing the duration by the timescale to arrive at the total running time;

extracting the sample count and the sample size from the media file; and dividing the sample count by the total running time to arrive at the sample-count-per-time;

d) sequentially adding up the sample size of each the sample-count-per-time to calculate data-size-per-time;

e) generating a table indicating the calculated data-size-per-time;

f) measuring a data size of currently downloaded data among the media file;

g) determining a media play time corresponding to the measured data size of the currently downloaded data using the generated table; and h) displaying the determined media play time of the currently downloaded data.

6. The method of claim 5, wherein:

the duration and the timescale are extracted from a movie header box of the media file; and the sample count and the sample size are extracted from a sample size box of the media file.

7. The method of claim 5, wherein the act e) comprises generating the table using the data-size-per-time extracted from a user data box of the media file.

8. The method of claim 5, wherein the act a) comprises requesting, by a mobile communication terminal, an MPEG-4 media file from a media server.

9. The method of claim 5, wherein the act h) further comprises displaying a downloaded data size, a total data size, and the total running time.

10. A method for facilitating the calculation of a media play time using a mobile communication terminal, the method comprising:

a) encoding a media file;

b) acquiring sample size and sample-count-per-time from information extracted from the media file, wherein the information extracted from the media file includes a duration, a timescale, a sample count and the sample size and wherein acquiring sample size and sample-count-per-time from information extracted from the media file includes:

extracting the duration and the timescale from the media file;

dividing the duration by the timescale to calculate a total running time;

extracting the sample count and the sample size from the media File; and dividing the sample count by the total running time to calculate the sample-count-per-time;

c) sequentially adding up the sample size of each the sample-count-per-time;

d) calculating a data-size-per-time according to a result of the adding up;

e) generating a table indicating the calculated data-size-per-time;

f) comparing a data size of currently downloaded data among the media file to the data-size-per-time included in the generated table;

g) determining a media play time of the currently downloaded data according to a result of the comparing; and h) recording the calculated data-size-per-time and the generated table in the media file.

11. The method of claim 10, wherein:

the duration and the timescale are extracted from a movie header box of the media file; and the sample count and the sample size are extracted from a sample size box of the media file.

12. The method of claim 10, wherein the encoding a media file comprises encoding an MPEG-4 media file.

13. The method of claim 10, wherein the act h) comprises recording the calculated data-size-per-time and the generated table in a user data box of the media file.

* * * * *